United States Patent
Petillo

(10) Patent No.: US 8,635,454 B2
(45) Date of Patent: Jan. 21, 2014

(54) AUTHENTICATION SYSTEMS AND METHODS USING A PACKET TELEPHONY DEVICE

(75) Inventor: Richard Petillo, Long Valley, NJ (US)

(73) Assignee: Vonage Network LLC, Holmdel, NJ (US)

( * ) Notice: Subject to any disclaimer, the term of this patent is extended or adjusted under 35 U.S.C. 154(b) by 532 days.

(21) Appl. No.: 12/509,589

(22) Filed: Jul. 27, 2009

(65) Prior Publication Data

US 2011/0022841 A1    Jan. 27, 2011

(51) Int. Cl.
*H04L 29/06*    (2006.01)

(52) U.S. Cl.
USPC .............................. 713/170; 713/155; 726/21

(58) Field of Classification Search
USPC ........... 713/150, 155, 168, 170; 726/4, 15, 21
See application file for complete search history.

(56) References Cited

U.S. PATENT DOCUMENTS

| 7,904,946 | B1* | 3/2011 | Chu et al. .......................... 726/5 |
| 2005/0268107 | A1* | 12/2005 | Harris et al. .................. 713/182 |
| 2005/0273442 | A1 | 12/2005 | Bennett et al. |
| 2006/0123478 | A1 | 6/2006 | Rehfuss et al. |
| 2006/0200855 | A1 | 9/2006 | Willis |
| 2007/0033635 | A1 | 2/2007 | Hirsave et al. |
| 2007/0220275 | A1 | 9/2007 | Heitzenberg et al. |
| 2007/0266257 | A1 | 11/2007 | Camaisa et al. |
| 2007/0283142 | A1* | 12/2007 | Milstein et al. ................ 713/155 |
| 2008/0086770 | A1 | 4/2008 | Kulkarni et al. |
| 2008/0098464 | A1 | 4/2008 | Mizrah |
| 2008/0267191 | A1* | 10/2008 | Smitheimer et al. ........ 370/395.5 |
| 2008/0285544 | A1* | 11/2008 | Qiu et al. ....................... 370/352 |
| 2009/0196285 | A1* | 8/2009 | Smires et al. .................. 370/352 |
| 2009/0259848 | A1* | 10/2009 | Williams et al. .............. 713/168 |
| 2011/0022844 | A1* | 1/2011 | Petillo ........................... 713/170 |

OTHER PUBLICATIONS

Von Ahn, L. et al. "reCAPTCHA: Human-Based Character Recognition via Web Security Measures", Science Sep. 12, 2008, vol. 321 No. 5895 pp. 1465-1468.*

* cited by examiner

*Primary Examiner* — Hadi Armouche
(74) *Attorney, Agent, or Firm* — Duane Morris LLP

(57) ABSTRACT

Authentication systems and methods for increasing the security of online account access and transactions by leveraging the use of customer equipment provided by VoIP service providers. A method includes registering a packet telephony device with a packet telephony service provider for subsequent packet telephony communication, where the registration is based at least on an encoded encryption key. On a subsequent request to access an account, instructions are transmitted which require physical access to the packet telephony device to perform. Upon receipt of an indication that the instructions were successfully performed, the request is authenticated and access to the account is granted. Authentication may require a secure connection be automatically established between a web-enabled device and a packet telephony device. The instant disclosure leverages the security in the customer equipment hardware such as a Terminal adaptor (TA) or router so that a compromised account may be recovered.

11 Claims, 13 Drawing Sheets

AUTHENTICATION SYSTEMS AND METHODS USING A PACKET TELEPHONY DEVICE

RELATED APPLICATIONS

The present application is related to U.S. patent application Ser. No. 12/509,794 filed herewith, entitled "Authentication Systems and Methods Using A Packet Telephony Device," the disclosure of which is hereby incorporated by reference.

BACKGROUND

The disclosure generally relates to authentication systems and methods for online management of a subscriber account. More specifically, the disclosure relates to authenticating a subscriber to a Voice over Internet Protocol (VoIP) service to prevent fraudulent access to the subscriber's online account.

The security aspect of a function such as user registration, authentication and transaction authorization on a network such as the Internet is important, yet subject to vulnerability. It is a common situation that users must register for a service, authenticate their identity, accept a transaction, or sign-in to web applications using a combination of credentials (typically username, password and/or email address). A recurring problem is that these credentials are subject to security vulnerabilities which may lead to identity theft, access to confidential information, or the conduct of fraudulent financial transactions. Once an unauthorized person (such as a hacker) has gained access to the user's accounts, they are able to masquerade as the user, gaining further access to private data, additional accounts and thereby the ability to cause further harm. This harm is to both the individual directly affected, and to the confidence of others in the integrity of the economic system based on eCommerce and banking transactions over the Internet.

Current methods used by unauthorized persons to gain access to users accounts and other personal data on the Internet include:

Guesswork—a person guesses the user's credentials and is able to log in to access their account;

Social engineering—a person posing as a trusted source (the eCommerce store owner, financial institution, etc.) tricks the user into revealing their credential; and Phishing—becoming commonplace on the Internet, in this deception an attacker masquerades an email, instant message or other electronic communication as being from a trusted entity in an attempt to lure recipients into divulging sensitive information such as usernames, passwords and credit card details. Phishing often directs users to enter details at a fake website whose look and feel are almost identical to the legitimate one. Attackers can then use data such as login credentials to access an actual account and otherwise use confidential information entered innocently by the unsuspecting user.

Pharming—a deception where an attacker redirects a websitets traffic to another, bogus website. Pharming is typically attempted by changing the hosts file on a victim's computer or by compromising DNS server software. Compromising a DNS server, which is a computer responsible for resolving Internet names into their real addresses, allows website traffic directed to a particular website name to be rerouted to an attacker's site.

Malware—Any variety of malicious software that an attacker can use to infiltrate or damage a computer system. One form of malware, called spyware, can be surreptitiously installed in a victims computer to monitor and transmit user information, including login credentials. When the user doesn't change the information, the harvested credentials can be reused by the attacker.

Existing techniques to increase security and reduce the vulnerability of personal information include those noted below along with their significant disadvantages.

One method is a system in which stronger passwords are enforced. Such systems may make passwords harder for thieves to guess but do not overcome social engineering or phishing attacks. Furthermore, they have the side effects that users forget their passwords resulting in higher customer support costs and lower user satisfaction. Also, when passwords are difficult to remember, users write their passwords down on paper or store them in insecure files.

Another system is that of biometrics where such a system includes a fingerprint or retina scanner, etc. Deploying such systems however is prohibitively expensive for all but the most highly valuable use cases because they require additional hardware. Furthermore, the typical systems are fingerprint based or iris-based, both of which are metrics that can be stolen (fingerprints left on wine glasses, or iris photographed by a telephoto lens). Further, once these credentials are stolen, they are stolen for life. Systems that require the user to insert a specially coded card are referred to as smartcard system. These systems are relatively expensive to deploy.

One prior art reference Heitzeberg et al. US 2007 0220275 A1 entitled, "WEB AUTHORIZATION BY AUTOMATED INTERACTIVE PHONE OR VoIP SESSION," incorporates the use of two separate channels as a supplementary method for verifying a user's identity. The first channel being the internet and the second channel being a response entered on a standard or VoIP phone. Heitzeberg, however, requires placing a call or sending information to a user's telephone number, which can be forwarded to an attacker. Thus, the attacker may overcome such security mechanisms.

Camaisa et al. U.S. 2007 0266257 A1 entitled, "SYSTEM AND METHOD FOR BLOCKING UNAUTHORIZED NETWORK LOG IN USING STOLEN PASSWORD," offers an approach where the authenticity of a website is determined using a unique string of characters known only to the user and the web site on each page of the website that is displayed to the user, with a false site being incapable of displaying this unique string of characters, thereby putting the user on notice that the current site is not the authentic one the user desires to access. The user computer is authenticated by machine ID and login keys managed using cookies. Further, voice methods for conveying one-time pass codes to users and for permitting customer institutions to select authentication rules are also disclosed.

Camaisa installs a cookie on the user's personal computer, but users routinely clean cookies in an attempt to remove suspicious spyware/adware. Also, even if the cookie has not been cleaned, the cookie resides on the PC. As a result, the authentication provided by the cookie and the authentication provided by the user login occur over the same channel which is susceptible to a man-in-the middle attack. The PC displays a user approved secret to the user to prevent phishing/pharming, but the user approved secret may be discovered by an attacker and presented on a pharmed website. Camaisa also sends an OTP to a user via phone line, but phone calls, as mentioned previously, can be forwarded to an attacker.

U.S. 2008/0086770 to Kulkarni et al. "SINGLE-PARTY, SECURE MULTI-CHANNEL AUTHENTICATION FOR ACCESS TO A RESOURCE". Kulkarni et al discloses a method for using multiple channels to access a resource, wherein an authenticated user requests a resource that requires a second authentication parameter over a first channel, a token value is transmitted to the user on the first channel, and the user transmits the token value and a second authentication parameter over a second channel. The token value is used to associate the first authentication parameter to the second authentication parameter, whereby the user is allowed access to the resource on the first or second channel. The token value, however, can be intercepted via the first channel and used on both the first and second channels.

In a separate effort, phone companies are increasingly using computer networks, such as the Internet, to transport long distance calls from one destination to another. Transferring voice calls over a data network is typically accomplished by converting analog voice signals into data packets. This is typically, but not necessarily, accomplished using an industry standard known as Voice over Internet Protocol (VoIP). Transporting calls over computer networks allows phone calls to be transported more efficiently. Additionally, because computer network infrastructures are already in place, the cost of transporting calls over computer networks is greatly minimized. As a result VoIP services have become pervasive.

VoIP providers supply customers with customer premise equipment (CPE) to enable VoIP calls. One such CPE is a terminal adaptor (TA) that enables a traditional plain old telephone service (POTS) phone to operate with a VoIP network. A TA may be a stand alone device, or may be integrated into a VoIP enabled phone, including portable phones. In this disclosure, such devices are generally referred to as packet telephony devices. The terms customers, users and subscribers are generally used interchangeably in this disclosure.

FIG. 13 illustrates typical prior art devices, including TA 1301, a VoIP enabled phone 1303 and a web-enabled device 1305 used in providing VoIP services over Internet 1306. TA 1301 is connected to POTS phone 1302. Typically, TA 1301 contains an encryption key (EK) known only to the VoIP service provider. The web-enabled device 1305 is shown as a personal computer, however, other web-enabled devices such as PDAs, Blackberrys, Smart phones, televisions, laptops and smart appliances are equally envisioned. At a minimum, a web-enabled device is adapted to allow a user to browse the web using a graphical user interface and input keys. Web-enabled devices allow users to make web based requests such as a request to access an online subscriber account or a request to make an online transaction, including purchases. Web-based requests are well known. The VoIP service provider may utilize servers 1307, routers, processors, databases and other equipment to manage and facilitate VoIP service over the Internet 1306.

VoIP users are able to access their VoIP accounts via the web using a web-enabled device. Access to these accounts, however, suffers from some of the same vulnerabilities described above.

There remains a need for a secure method that solves or ameliorates at least some of the deficiencies of the prior art.

Several embodiments of the disclosed subject matter leverage customer premise equipment (CPE) and an embedded unique encryption code associated with a VoIP or other specialized type data service. The disclosure provides systems and methods in which a terminal adaptor (TA) CPE, not a general processing PC, is utilized as a security mechanism for accessing a web account. In one embodiment, an OTP may be displayed on a TA/router CPE display, which has an encrypted code separate from the computer. In one embodiment, a system enables a website authentication code to display on the TA/router CPE.

An object of the disclosure is to present a novel method for authenticating access to a subscriber account that obviates the deficiencies of the prior art. The method including registering a packet telephony device with a packet telephony service provider for subsequent packet telephony communication based at least on an encryption key encoded, receiving a request to access an account, and transmitting an instruction, the performance of which requires physical access to the packet telephony device. The method further includes receiving an indication of the performance and authenticating the request based upon the performance of the instruction.

Another object of the disclosure is to present a novel method for authenticating a website, such that users are assured they are not on a masquerading website. The method includes registering a packet telephony device with a packet telephony service provider including verifying an encryption key encoded in the telephony device; receiving a request via a website to access a subscriber account and transmitting codes to both the web-enabled device and the packet telephony device for display. The method allows the subscriber to use the associated website verification codes as displayed as an indication of the authenticity of the website.

It is yet another object of the present disclosure to present a novel packet telephony device. The device including a signaling module for receiving, processing, and generating telephony signaling packets; a media module for receiving, processing, and generating telephony media packets; an encryption module having an encryption key encoded therein; and an authentication trigger. Upon actuation of the authentication trigger, the device transmits an authentication communication generated based on an encryption key in the encryption module. The authentication communication may be a signaling packet.

The disclosed subject matter overcomes or mitigates deficiencies of the prior art by advantageously providing an additional layer of security utilizing a CPE associated with VoIP service without resorting to the prior art methods and their associated disadvantages as described above. These and many other objects and advantages of the present invention will be readily apparent to one skilled in the art to which the invention pertains from a perusal of the claims, the appended drawings, and the following detailed description of the preferred embodiments.

DETAILED DESCRIPTION

Figure 1:
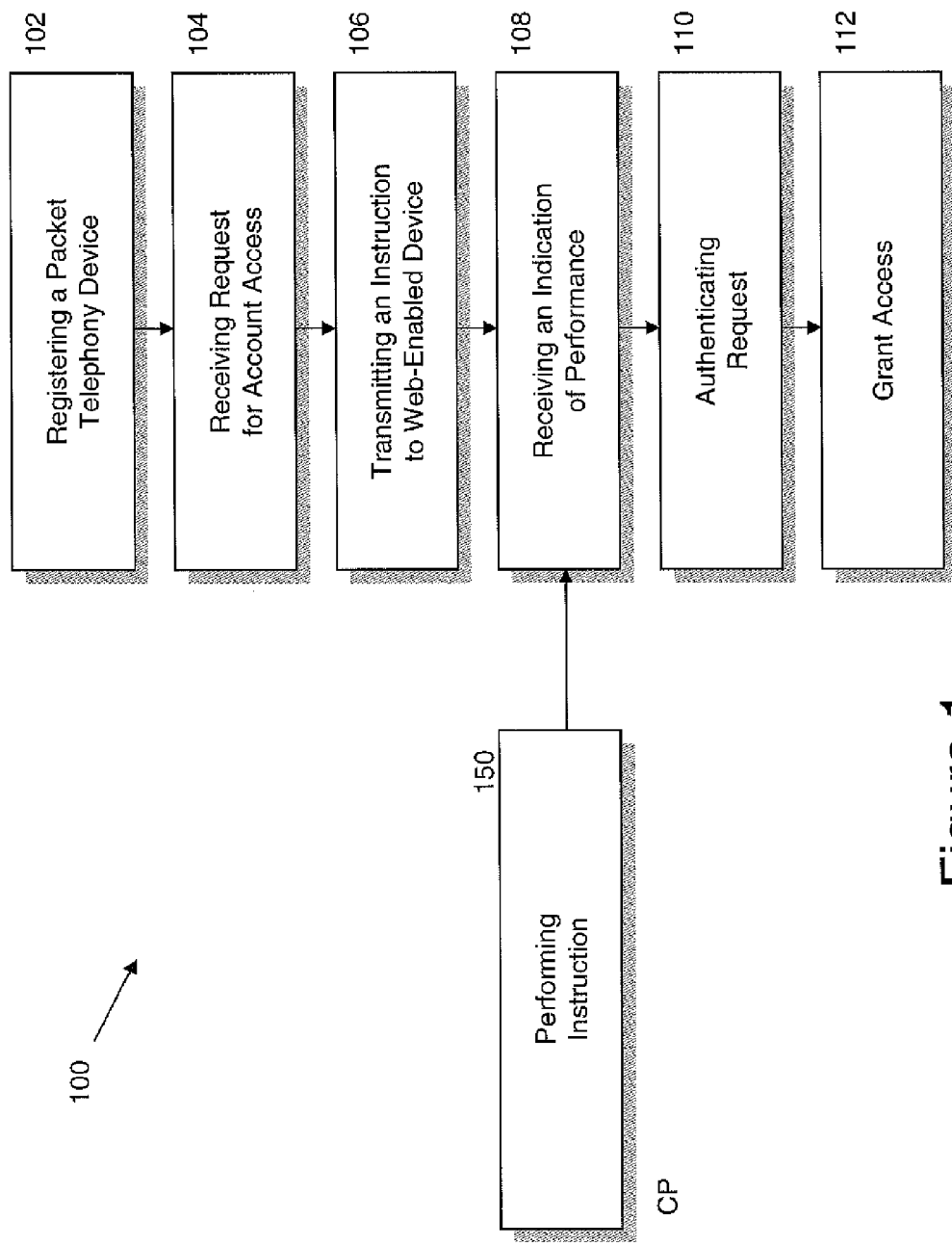
FIG. 1 illustrates a method for authenticating access to a subscriber account according to an embodiment of the subject matter.

Various embodiments of the disclosed subject matter will now be described in detail with reference to the figures. Like reference numerals refer to like elements. One of ordinary skill in the art will appreciate the applicability of the teachings of the detailed description to other embodiments. While embodiments of the disclosed subject matter will be described in detail, it is to be understood that the embodiments described are illustrative only and the scope of the subject matter is to be defined solely by the appended claims and their full range of equivalence.

FIG. 1 is a flow chart for a method 100 of authenticating access to the subscriber account using the web-enabled device along with a TA or other VoIP CPE. The TA, which is a packet telephony device, is registered with a VoIP or a packet telephony service provider in order to provide subsequent VoIP service as shown in Block 102.

Figure 2:
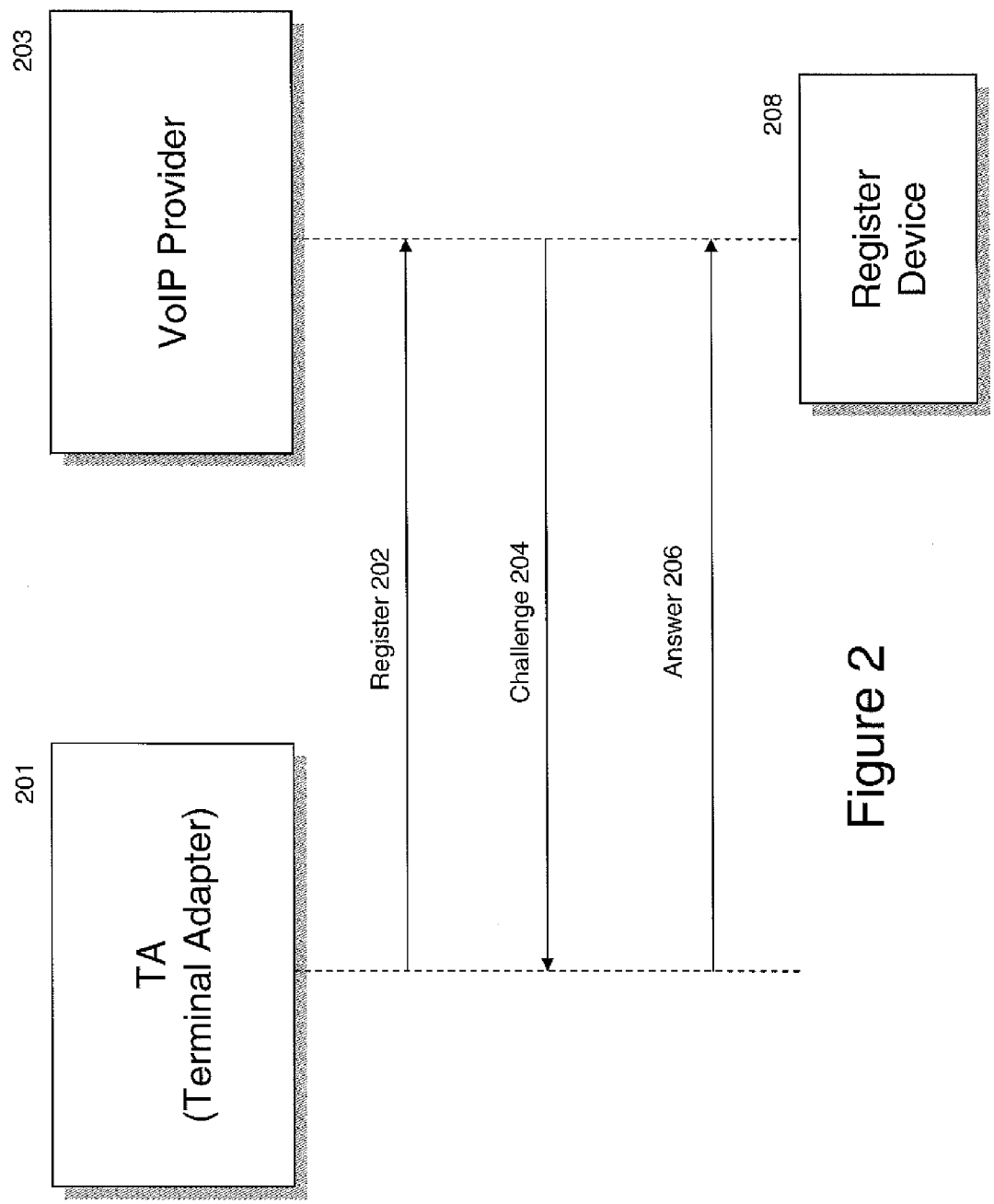
FIG. 2 illustrates a method for registering a packet telephony device according to an embodiment of the current subject matter.

An exemplary registration process is shown in FIG. 2. The TA 201 transmits over a packet network (e.g., Internet) a register message 202 to the VoIP provider 203. The VoIP provider 203 responds back to the TA 201 with a challenge message 204. The TA 201 answers the challenge message 204 with an answer message 206 based in part on the encryption key of the TA, which is a shared secret with the VoIP provider 203. If the answer message 206 is reflective of the encryption key for the TA 201, the VoIP provider 203 registers the TA 201 as shown in Block 208. These messages are typically packet based signaling protocols such as SIP or H.323.

In Block 104, a request is received from the web-enabled device for accessing the subscriber's account. In this example the subscriber's account is the VoIP account, however, the account can be any account linked to the subscriber's VoIP provider. For example, a VoIP service provider may provide the authentication services described herein as a service to non-telephony parties. The request may include the subscriber's user name and password, as well as other indentifying indicia. The request may be received by the VoIP provider or an associated entity or agent. "Receiving a request" should be taken as including requests forwarded or relayed by a non-telephony party to a VoIP service provider for authentication. The VoIP service provider or associated entity or agent has the ability to determine a packet telephony device associated with a user name and password. The determination is usually made by accessing or querying an account profile maintained by the service provider.

Figure 5:
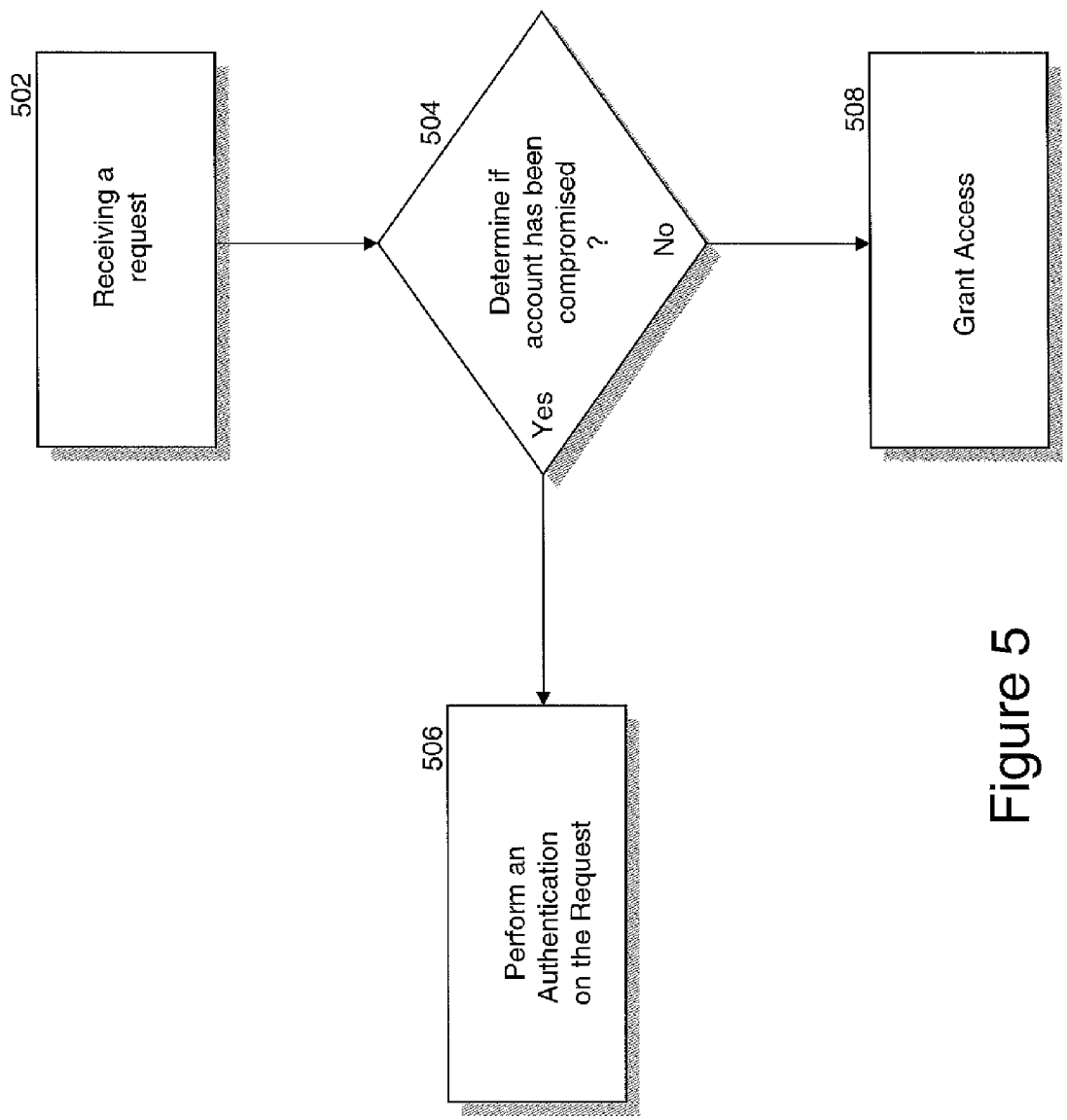
FIG. 5 illustrates a method for authenticating access to a subscriber account based on the status of the account according to an embodiment of the current subject matter.

In one embodiment, illustrated by FIG. 5, receiving the request for access results in authenticating access to a subscriber account based on the status of the account. The receiving entity, after receiving the request as shown in Block 502, determines whether the account may have been or is compromised as shown in Block 504. This determination may be based on frequency of access, deviation from a predetermined pattern of access, the first access occurrence, the logical origination of the request or the geographic origination of the request, notification by the user, suspicious online activity in the subscriber's online user account, suspicious communications activity, e.g., excessive international calls or several other fraud indicating factors/events. If it is questionable that the account has been compromised, an authentication process follows as shown in Block 506, if however, it is determined that account is not likely compromised, access may be granted as shown in Block 508.

Figure 3:
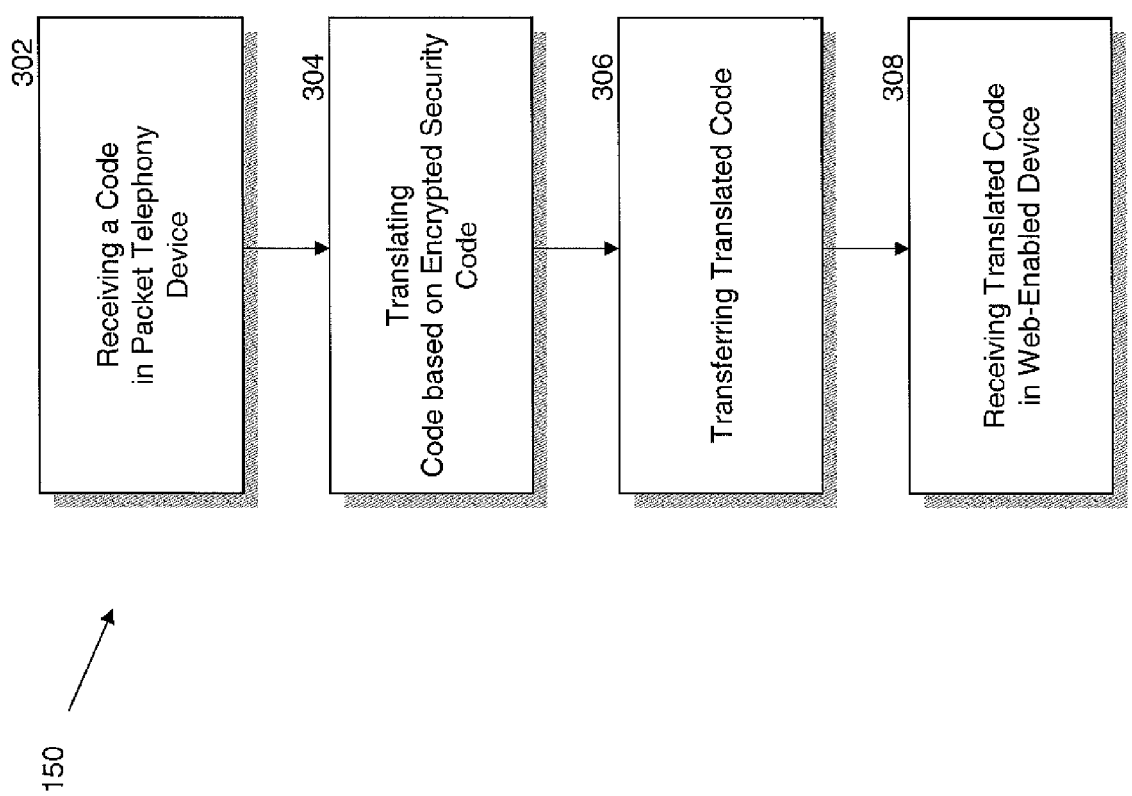
FIG. 3 illustrates a performance of an instruction according to an embodiment of the current subject matter.
Figure 4:
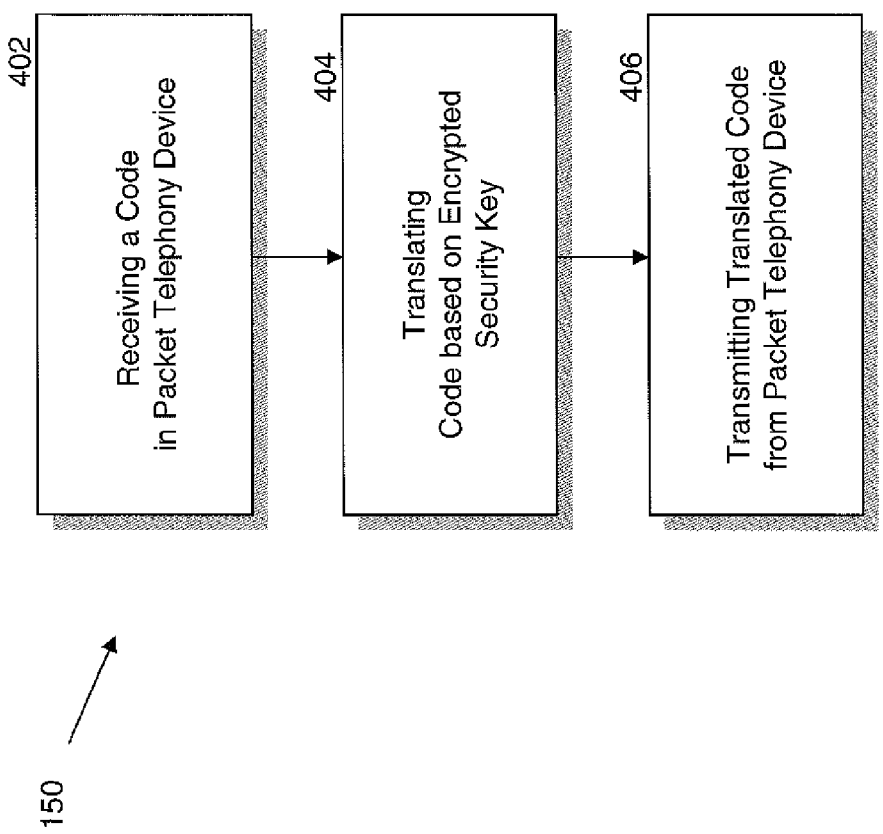
FIG. 4 illustrates another performance of an instruction according to an embodiment of the current subject matter.

As part of the authentication process illustrated in FIG. 1, after receiving the request for access 104, an instruction is transmitted to the web-enabled device as shown in Block 106. The instruction is of a nature that its performance requires the user or the web-enabled device to have physical access to the TA or other CPE. Physical access may be any restricted access that provides an appropriate level of security. For example, in one embodiment, physical access merely requires that a user be able to read text displayed on the packet telephony device. In another embodiment, physical access requires a user being able to touch the packet telephony device. In yet another embodiment, physical access requires an automated communication that enables the web-enabled device to gain access to the packet telephony device, such as over a local area network (including Ethernet), wireless local area network (including Wi-Fi), wireless personal area network (including Bluetooth) or other secure connection. Wireless local area networks (WLAN) encompass any number of wireless local area network protocols, including those operating on the IEEE 802.11 set of standards, such as 802.11g and 802.11n. The connection may be sufficiently secure due to its localized reach, physical isolation of components, or by security mechanisms such as shared key handshaking. FIGS. 3 and 4 illustrate performance of instructions requiring such physical access to the TA or other CPE.

FIG. 3 illustrates the performance 150 according to one embodiment of the disclosed subject matter. A code is received into a packet telephony device as shown in Block 302. In this embodiment, the code may have been displayed to a user via the web-enabled device, with the user entering the code via keys on the TA. The code may then be translated based in part on the encryption key within the TA as indicated in Block 304. The translated code may then be transferred from the TA as described in Block 306. In one embodiment, the translated code is transferred from the TA by displaying it to a user. The translated code may then be entered into the web-enabled device for transmission via the Internet, or other packet network, to the VoIP provider as indicated in Block 308. The user typically enters the translated code into the web-enabled device by typing, but any known method of data entry is acceptable, including speech synthesis. Alternatively, the receiving and transferring of the codes may be accomplished by automated mechanisms discussed below.

FIG. 4 illustrates the performance 150 according to another embodiment of the disclosed subject matter. FIG. 4 shows receiving a code into the TA or other packet telephony device as shown in Block 402, the code is then translated based in part on the encryption key within the TA as indicated in Block 404 and is sent via VoIP signaling to the VoIP provider. The code entered into the TA may be a predetermined code, known to both the VoIP provider and the user, a one time code generated by VoIP provider and provided to the web-enabled device or a combination thereof.

The performance required could also involve activation of a trigger mechanism on the TA. The activation of a trigger mechanism could be the entry of a predetermined code as noted earlier or it could be the activation of a switch or depression of a key, which automatically initiates a translation based on the encryption key. In addition, the performance could involve disabling the TA from the network, such that upon reconnecting, the TA must reestablish its credentials with the VoIP provider including verification of the encrypted key. As such, the VoIP provider will be able to detect that an instruction to temporarily disable a telephony packet device has been performed, which may be sufficient indication that the user has physical access to the device. The performance may also include entry of a display code on the TA that was pushed by the VoIP provider concurrently with the request, or independently of the request.

In several of the discussed embodiments, a user is typically required to actively take steps to enter a code or otherwise trigger authentication in response to an instruction 106. In an alternative embodiment, the packet telephony device communicates directly with the web-enabled device to passively or automatically authenticate a request from a web-enabled device. Thus, one or more steps discussed above may be automated, as discussed further with respect to FIG. 12.

Referring again to FIG. 1, after the performance of the instruction as indicated in Block 150, an indication that the instruction has been performed is received as shown in Block 108. This indication includes an objective parameter by which the success of the performance can be determined. The request is authenticated based upon the performance of the instruction as shown in Block 110 such as the correct translated code being return by the web-enabled device or the TA, i.e. the returned translated code is correctly based upon the known encrypted key associated with the customer's TA. Two illustrations follow.

In the context of FIG. 3, the performance may require the user to input their zip code "20004" into the TA. The code "20004" is then translated based in part on the encryption key within the TA, for illustrative purposes only, the encryption key may be thought of as a five digit number, such as "12345", and the translation function may simply be thought of as the addition of the numbers resulting in a translated code of "32349". The translated code is then displayed on the TA for viewing by the user. The user may then enter the translated code of "32349" into the web-enabled device which is transmitted via the web to the VoIP provider. The VoIP provider may then authenticate the request upon receipt of the proper code because the VoIP provider knows, in this example, both the user's zip code and the encryption code on the TA. Without access to the subscriber's TA, an attacker would not be able to provide the proper code.

In the context of FIG. 4, the translated code "32349" may be sent directly from the TA and need not be displayed. For example, the TA could transmit a signaling packet containing the code to the VoIP provider. By transmitting back to the VoIP provider using a separate protocol and connection, this embodiment provides an extra layer of security. Other indications of performance are apparent from the context of the particular performance. For example, if the instruction requires disabling the TA temporarily, the indication of performance may be a timely failure of the TA to send a periodic message to the service provider or the indication could be a timely initial registration message. Referring again to FIG. 1, upon authentication of the request, access to the account is granted as shown in Block 112.

Figure 6:
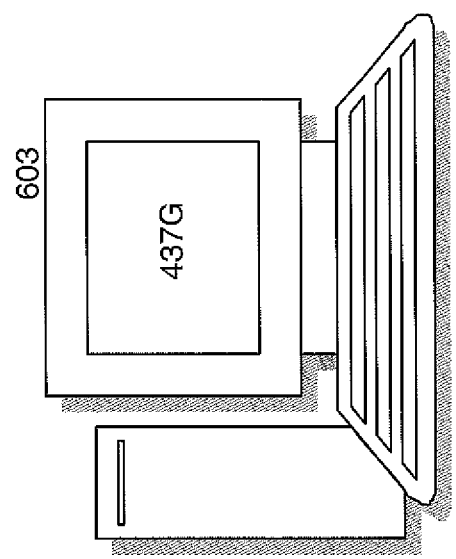
FIG. 6 illustrates the display of a website verification code according to an embodiment of the current subject matter.
Figure 6:
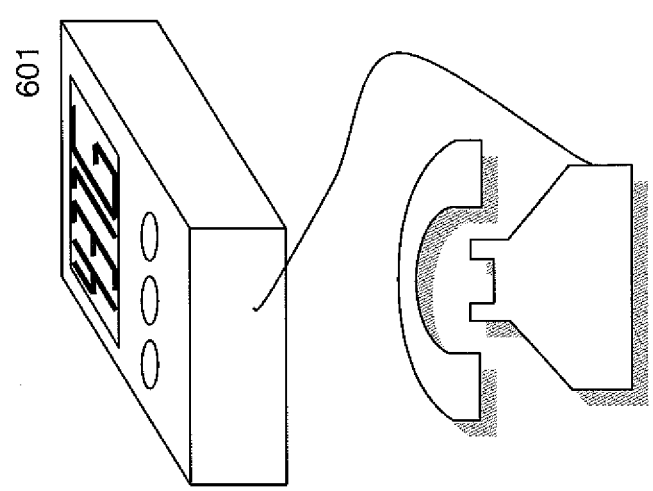
Figure 7:
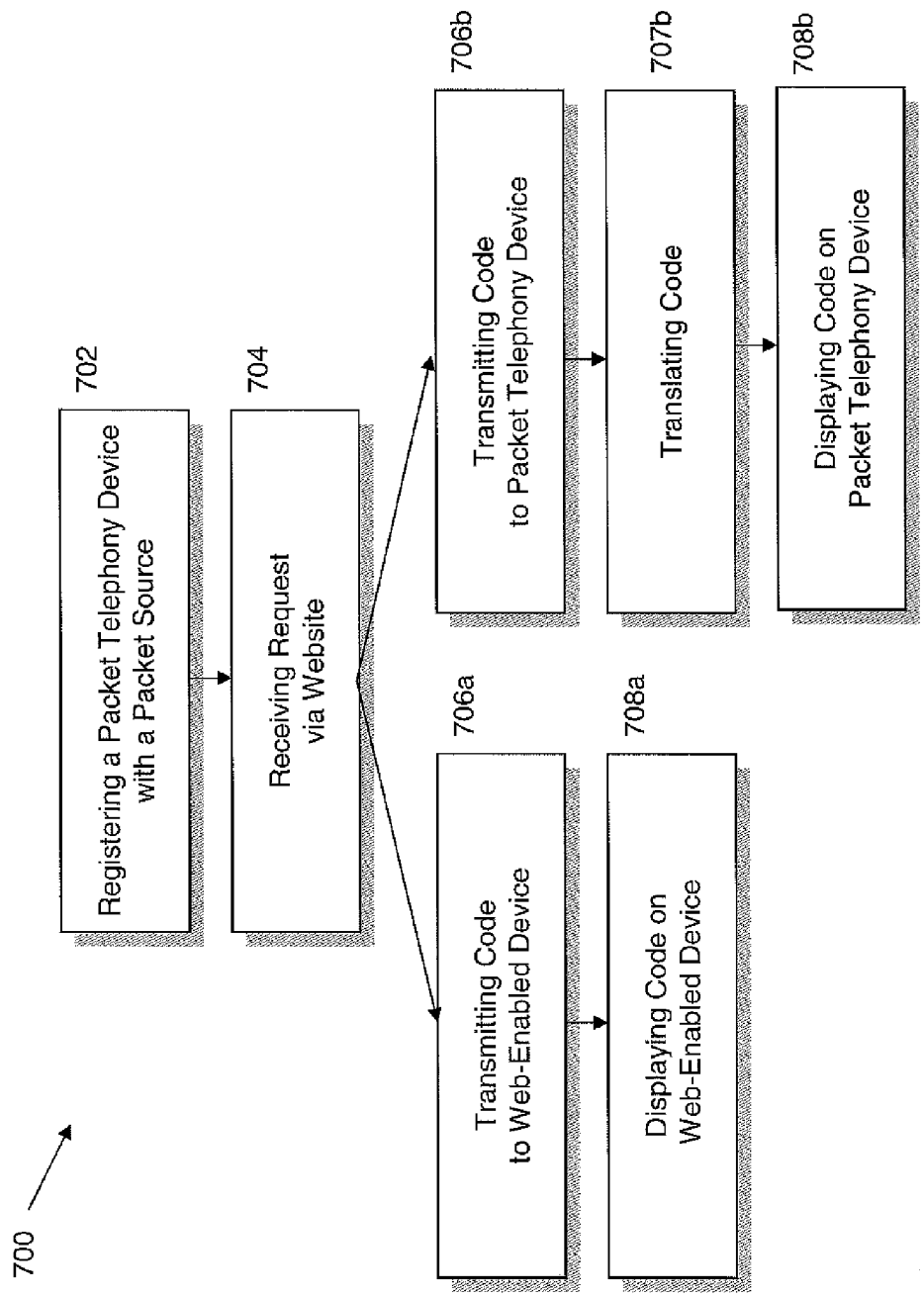
FIG. 7 illustrates a method for authenticating a website to a subscriber according to an embodiment of the current subject matter.

FIGS. 6 and 7 illustrate methods by which a user can authenticate a website and avoid being a victim of a pharming attack. As shown in FIG. 6, the subscriber need only verify a code displayed on the TA 601 corresponds to a code displayed from the VoIP provider's website on the user's web-enabled device 603. In FIG. 6, both displays show an identical code, "437G", and thus the user can be confident that the website is actually that of the VoIP provider and not a masquerading site.

FIG. 7 illustrates an embodiment of a method by which display codes may be generated. In block 702, a TA or other packet telephony device is registered with the VoIP provider and as a result the TA is associated with the user's account. A request is received via the VoIP provider's website from a user as shown in block 704. This request can take a variety of forms, from simply browsing to a website to logging in with personal credentials, and many actions in between. Upon receiving the request, the VoIP provider may transmit a code via the website to the web-enabled device from which the request was received as shown in Block 706a. The transmitted code received by the web-enabled device may be displayed as a website verification code as shown in Block 708a.

Similarly, a code may be transmitted via the network to the TA as shown in Block 706b. As shown in Block 707b, the transmitted code may be translated as a function of the encryption key. The translated code may be displayed upon the TA as a website verification code as shown in Block 708b. As such, a malicious interception of the code sent from the VoIP provider would not be indicative of the displayed code without knowledge of the encryption key within the TA.

Figure 8:
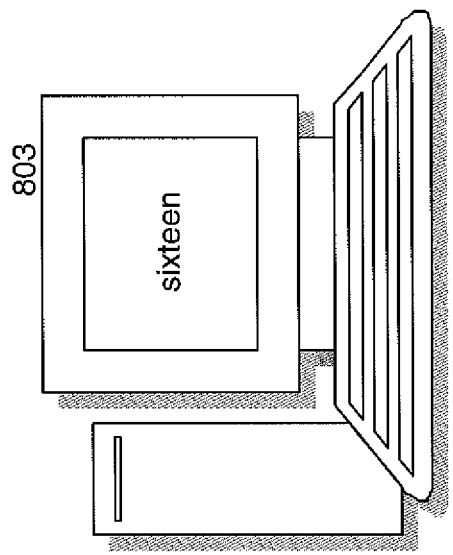
FIG. 8 illustrates the display of a website verification code according to another embodiment of the current subject matter.
Figure 8:
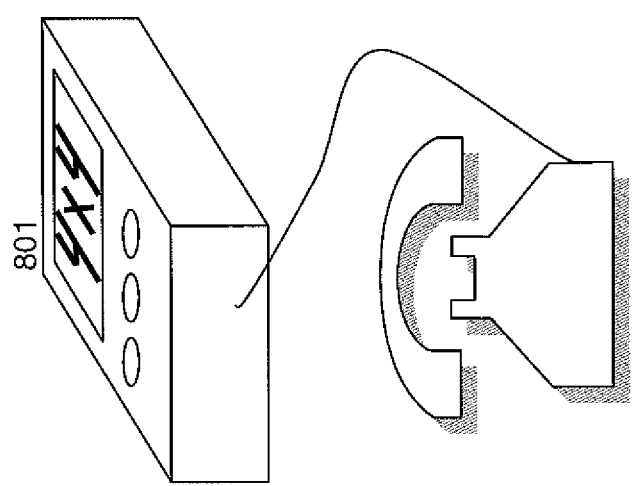

Additional security can result by generating codes that when displayed share a logical or thematic relationship such that the encryption key could not be easily discovered. An example of such a logical or thematic relationship is shown in FIG. 8, where the displayed code is "4×4" on the TA and the website displays "sixteen". By recognizing this relationship, the user can be assured the website is not fraudulent. It should be understood that the VoIP provider would necessarily take into account the encryption key in deriving the code to send to the TA in block 706b such that the translation in block 707b produces the desired display code in block 708b.

Only the VoIP provider has secure line of communication with the TA and thus a pharming or similar scheme would be unable to present a user with the same website verification code as displayed upon the TA. Thus, in one embodiment, codes transmitted to the TA need not be translated.

Figure 9:
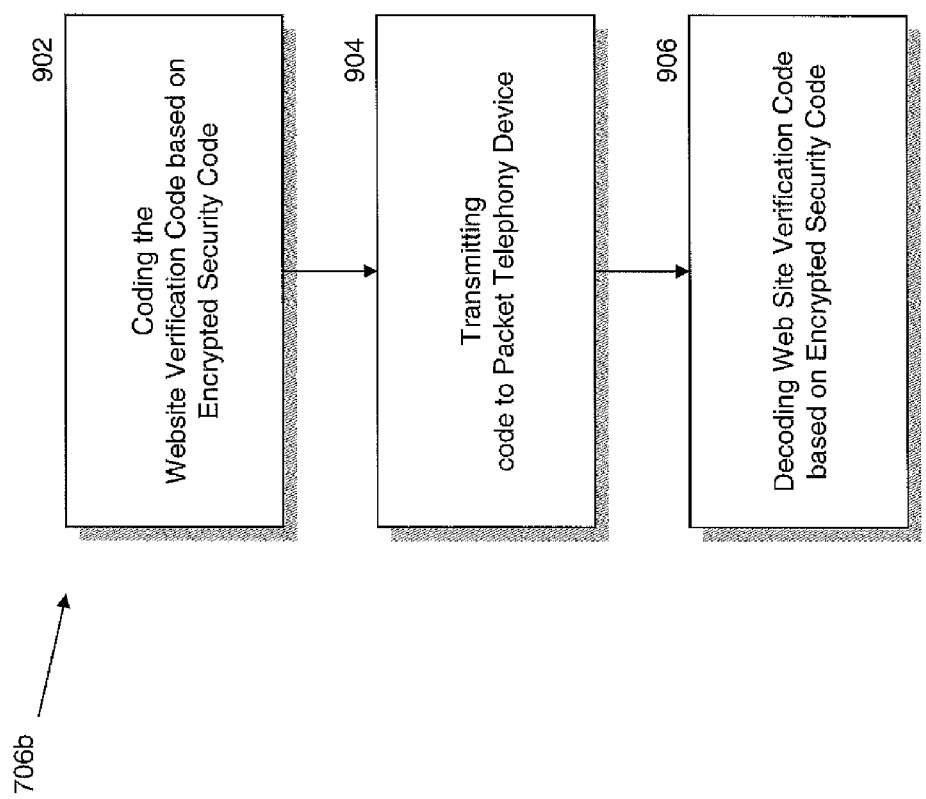
FIG. 9 illustrates the coding of the website verification code according to an embodiment of the current subject matter.

FIG. 9 illustrates an embodiment in which the encryption key is utilized in determination of the transmitted code. In Block 902 the code transmitted to indicate the website verification code is determined based on a function of the known encryption key (EK) of the TA (i.e. $f_{EK}$(Web verification code)=transmitted code). The code is transmitted to the TA in Block 904 and is decoded at the TA using an inverse function of the encryption key to arrive back at the website verification code (i.e. $f_{EK}^{-1}$(transmittedcode)=Web verification code) in block 906 for display.

Figure 10:
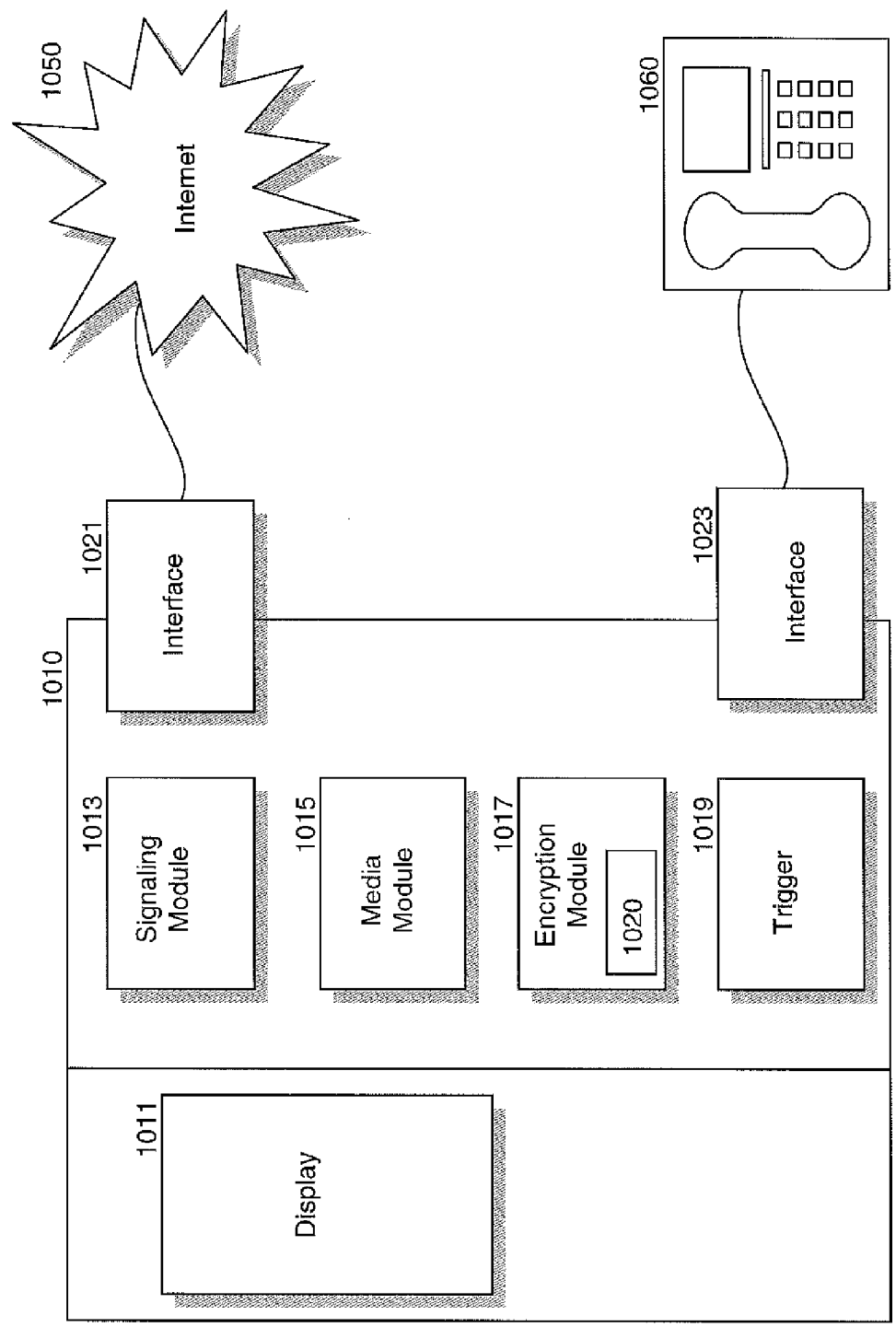
FIG. 10 illustrates a packet telephony device according to an embodiment of the current subject matter.

FIG. 10 is a schematic of a packet telephony device 1010, such as a TA or VoIP enabled phone. The packet telephony device 1010 includes a signaling module 1013 configured for receiving, processing, and generating telephony signaling packets. Typically this is a processor that handles SIP, H.323 and other packet based signaling protocols. A module, as used herein, generally includes electronic hardware or software encoded in electronic hardware.

The packet telephony device 1010 also includes a media module 1015 configured for receiving, processing and generating telephony media packets, such as voice or image packets typically in the form of Real Time Protocol (RTP) packets. The media module 1015 converts the packets into voice or image signals and vice versa.

The packet telephony device 1010 also includes an encryption module 1017 having an encryption key 1020 encoded therein. The encryption key may be randomly generated or unique to each device. A user actuable authentication trigger 1019 is also contained in the packet telephony device 1010. The trigger may take the form of a single button, switch or actuator or in the form of a plurality of input keys or buttons configured to actuate the trigger when depressed in a certain sequence or combination.

When actuated, the trigger causes the packet telephony device to transmit an authentication communication generated as a function of the encryption key. In one embodiment the authentication communication is transmitted as a signaling packet, for example, to a telephony service provider. In other embodiments, the packet telephony device is adapted to transmit the authentication communication to a local web-enabled device. The local web-enabled device may preferably be a computer on the same private network as the packet telephony device. Alternatively, the authentication communication may be over a short range wireless connection such as over a wireless local area network (WLAN), a Bluetooth connection or the like.

The packet telephony device 1010 also includes a first interface 1021 for connection to a packet network 1050, such as the Internet and a second interface 1023 for connection to a non-packet telephone 1060. In the case of a VoIP enabled phone the second interface is integrated within the same housing. The device of FIG. 10 also includes a display 1011, such that the device may display authentication codes, including a website verification code, as discussed with reference to FIG. 7. The display 1011 is connected to the signaling module 1013 to display a code. The code may be based at least in part on the encryption key. Alternatively, the displayed code may be information received in one or more signaling packets from said packet network.

Figure 11:
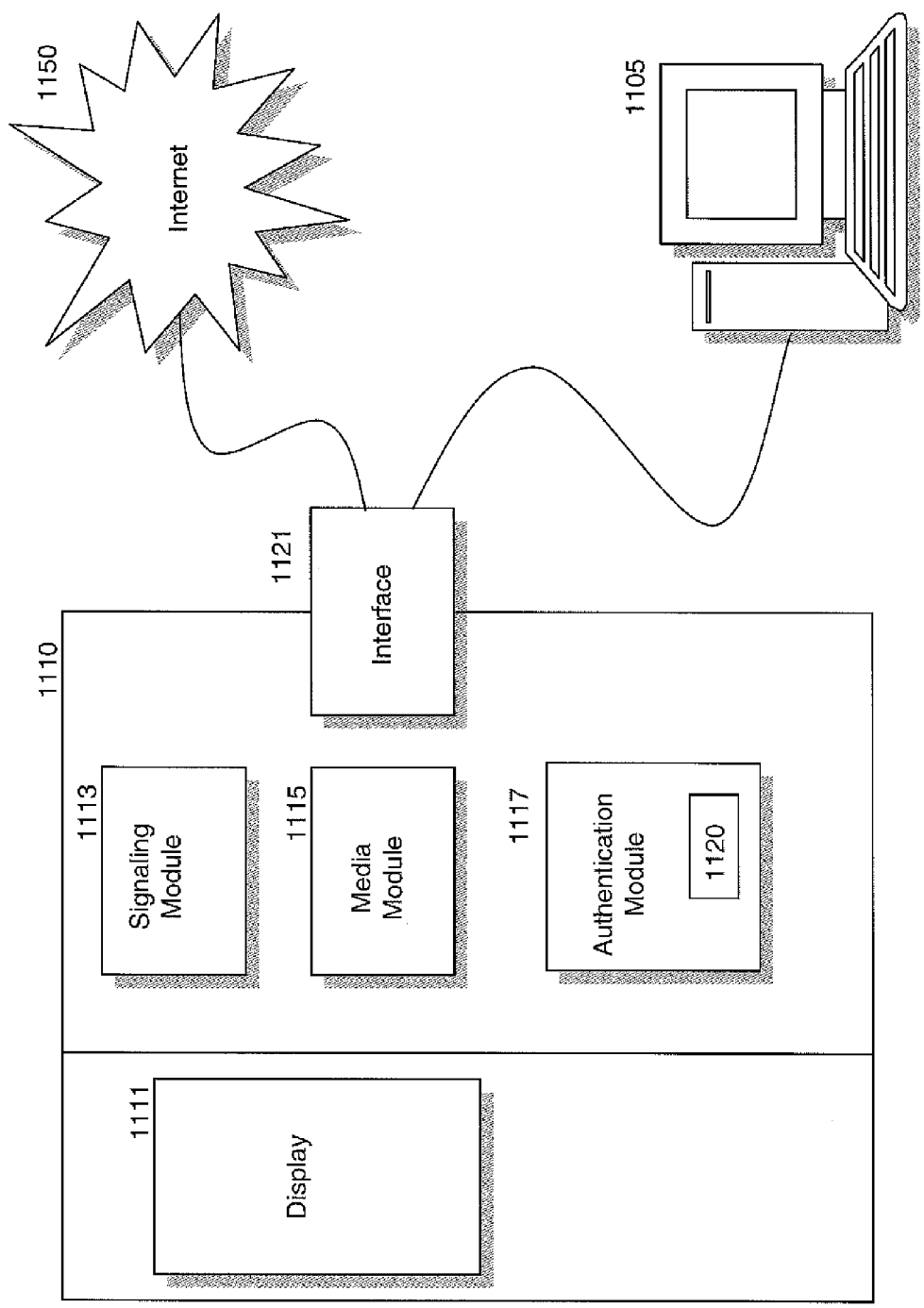
FIG. 11 illustrates a packet telephony device according to an embodiment of the current subject matter.

FIG. 11 is a schematic of a packet telephony device 1110, such as a TA or VoIP enabled phone similar to that shown in FIG. 10, but configured for communicating with a web-enabled device 1105. Like reference numerals refer to like components. The packet telephony device 1110 has an authentication module 1117 having an encryption key 1120 encoded therein and configured to receive and translate a first code into a translated code based in part on the encryption key 1120. Other such authentication codes are envisaged. Packet telephony device 1110 has an authentication interface 1121 configured for establishing a secure connection with a web-enabled device 1105. Interface 1121 may be used for receiving or transmitting authentication codes, In one embodiment, the authentication module 1117 of the packet telephony device 1110 may receive a first code from signaling module 1113. For example, a packet telephony service provider may transmit the first code in a signaling packet, such as a SIP signaling packet. Signaling module 1113 may receive and process the signaling packet and transfer the first code to authentication module 1117. Authentication module 1117 may then translate the first code using at least encryption key 1120. Authentication module 1117 may apply various known hashing or other security algorithms to translate (i.e. encode or decode) the first code using the encryption key. Authentication module 1117 may use additional information, such as information entered by a user, time of day, date, for example. Authentication module 1117 may then transmit the translated code via interface 1121 over a secure connection to web-enabled device 1105. Packet telephony device 1110 may be a TA, a router/TA, a mobile IP phone or the like.

In an alternative embodiment, the authentication module 1117 of the packet telephony device 1110 may receive a first code from via interface 1121 over a secure connection from web-enabled device 1105. For example, when a user makes a request from web-enabled device 1105, a packet telephony service provider may respond by transmitting a first code to the web-enabled device with a software-based prompt to establish a secure connection to packet telephony device 1110. Web-enabled device 1105 may establish a secure connection via interface 1121 of packet telephony device 1110. Authentication module 1117 may then receive the first code automatically over the secure connection. Authentication module 1117 may then translate the first code using at least encryption key 1120. Authentication module 1117 may then transfer the translated code to signaling module 1113. Signaling module 1113 may receive the first code and generate a signaling packet, such as a SIP signaling packet, containing the transmitted code. In one implementation interface 1121 may be used to transmit the signaling packet to a service provider via internet 1150. In an alternative embodiment, the interface to the internet may be physically distinct from the interface to web-enabled device 1105. For example, the interfaces may depend on whether packet telephony device 1110 is a TA, a router/TA, a mobile IP phone or other variation.

The connection between interface 1121 and web-enabled device 1105 may take various forms. For example, the secure connection may be a short range wireless connection, such as over a wireless local area network (WLAN), a Bluetooth connection or the like. WLAN includes any number of wireless local area network protocols and standards, including the IEEE 802.11 set of standards, such as 802.11b, 802.11g, and 802.11n. The secure connection may be over a secure network such as a private network of a home or enterprise, as would typically be the case for a WLAN. While not shown in FIG. 11, the user actuable authentication trigger shown in FIG. 10 may also be implemented in this embodiment.

Other embodiments of the disclosed subject matter include the VoIP provider causing the TA to display a response code for the user to enter at the web-enabled device. The response code may be a one time password or code (OTP), or a time limited code. The response code may be displayed upon the TA unrelated to any access request, or may be displayed only upon an access request.

Advantageously, the user's other accounts may be linked to the VoIP account thus enabling banking accounts, credit card accounts, etc. to be accessed with the same security measures enabled by the packet telephony device.

In cases where the authentication fails, the VoIP provider may deny online access to the online user account and related accounts, deny predefined VoIP communications, notify the subscriber, and/or track the account activity to identify the source of the fraud.

Figure 12:
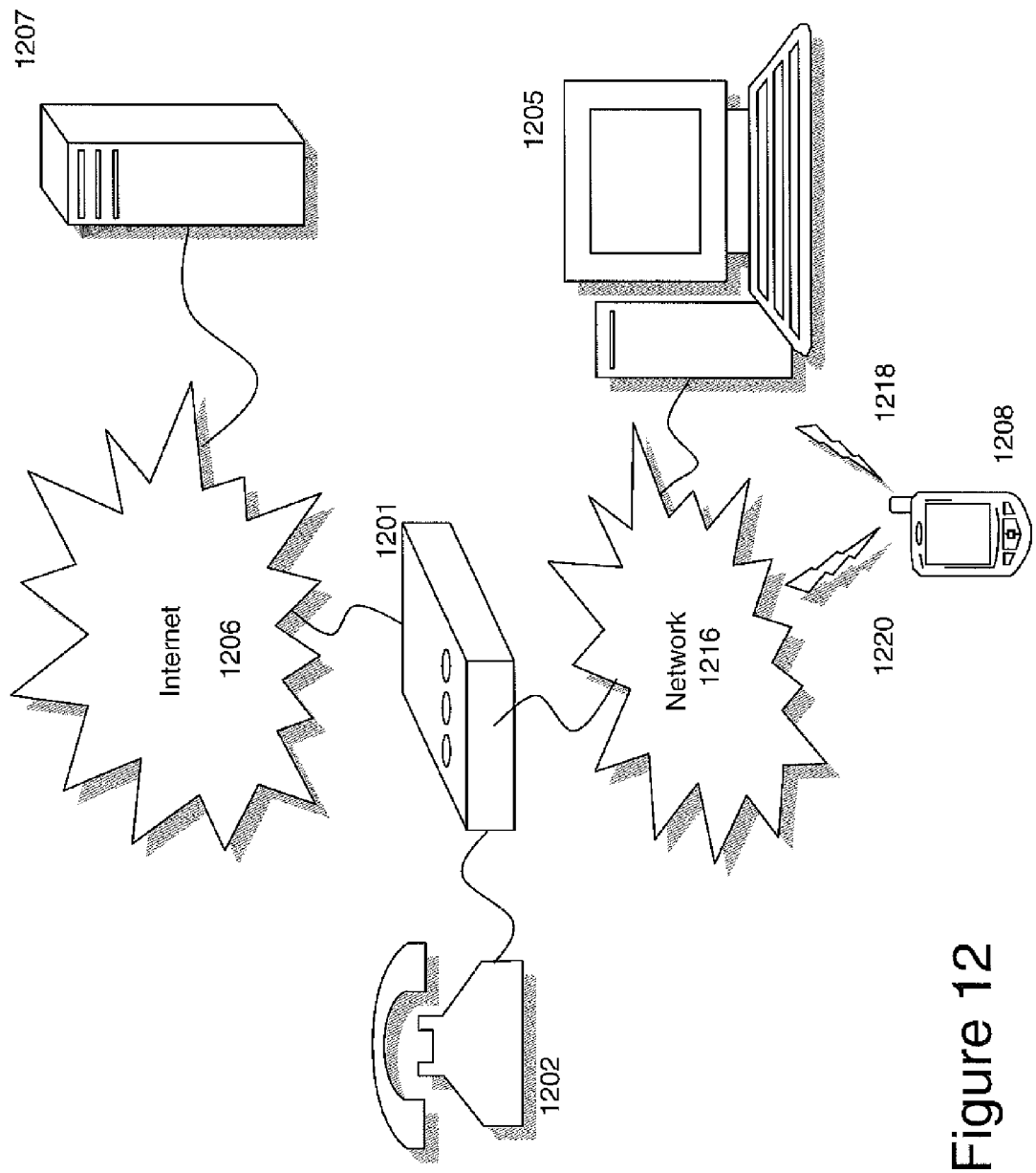
FIG. 12 illustrates packet telephony devices and a web-enabled device according to an embodiment of the current subject matter.
Figure 13:
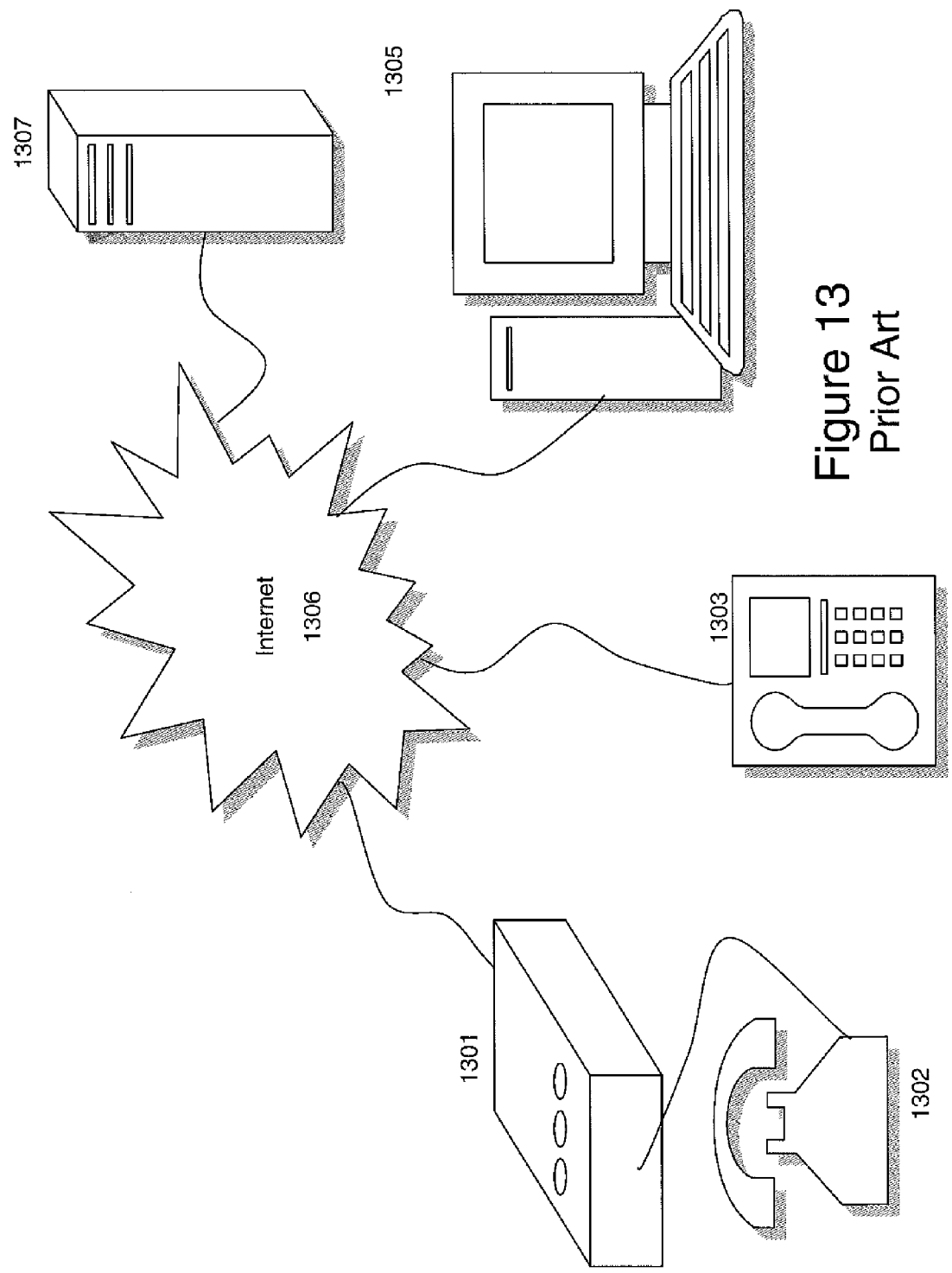
FIG. 13 illustrates typical prior art VoIP devices and web-enabled devices connected to the Internet.

FIG. 12 illustrates an embodiment wherein a packet telephony device may automatically communicate with and authenticate a request from a web-enabled device. The personal computer 1205 is a web-enabled device from which a user can request a transaction from a service provider operating server 1207. As is known, packet telephony devices may exist as a combined router/TA device, such as router/TA 1201. In one embodiment, router/TA 1201 provides personal computer 1205 on network 1216 with access to Internet 1206. Network 1216 may be deployed and referred to in various contexts as a private network, a local area network, a home network, a secure network, a proprietary network, an enterprise network or the like.

The TA function of router/TA 1201 may interface with POTS phone 1202 and may register for VoIP telephony as discussed with reference to FIG. 2. The router function of router/TA 1201 may interface with personal computer 1205 and other devices (not shown) on network 1216. In a typical configuration, the router function of the router/TA 1201 assigns a private IP address to web-enabled device 1205, for example, according to Dynamic Host Configuration Protocol (DHCP). The web-enabled device may communicate with the router/TA 1201 over a wireless connection, such as Wi-Fi, or a wired connection, such as a simple Ethernet cable or the like.

In use, a user may make a web-based request. For example, a subscriber may attempt to login to a subscriber account using personal computer 1205. A software based instruction may be sent via the internet to the router/TA 1201 or personal computer 1205, prompting a connection between the two. The router/TA 1201 is able to connect to the personal computer over network 1216. Network 1216 may be any network that achieves an appropriate level of security between the router/TA 1201 and the personal computer 1205. Depending on the sensitivity of the particular user request, an appropriate level of security may be achieved by security mechanisms such as shared keys, or simply by using physical isolation, such as that provided by wired connections.

In a further embodiment, the packet telephony device may be mobile IP phone 1208. Mobile IP phone 1208 may automatically authenticate web-enabled device 1205, for example, over a short range Bluetooth connection 1218. Alternatively, a secure connection between Mobile IP phone 1208 and personal computer 1205 may be established through router/TA 1201 and network 1216 via, for example, Wi-Fi connection 1220. Note that in this embodiment, router/TA 1201 could be replaced by any router or server that maintains network 1216, without need for TA functionality. Depending on implementation, the localized nature of network 1216 or Bluetooth connection 1218 may provide adequate assurance that the user of the personal computer 1205 has authorized physical access to the secure mobile IP Phone 1208.

In other implementations, network 1216 may be a geographically larger private network that nevertheless provides adequate assurance that the user of the web-enabled device has authorized physical access to the secure TA or packet telephony device. Assurance may be provided by any known security mechanisms used in geographically larger private networks, such as encryption, physical isolation, or shared handshake. The ordinary artisan will appreciate that an appropriate level of security will depend on the level of trust for the users who have been given access to network 1216.

In one embodiment, the automated mechanism is responsive to a one time event. For example, when a user attempts to login to a subscriber account, the service provider can initiate a software based prompt to either the web-enabled device or the packet telephony device, instructing the devices to establish a secure connection to each other. In other embodiments, the particular web-enabled device could be authenticated continuously or on a time-delay basis, such that the particular web-enabled device would be repeatedly authenticated for any subsequent login attempt or other web-based request. Any such automated mechanism between the packet telephony device and the web-enabled device is appropriate so long as it sufficiently authenticates the user of the web-enabled device.

The automated communication between the web-enabled device and the packet telephony device may be facilitated by software or firmware installed on the packet telephony device or the web-enabled device. Software on the web-enabled device may be, for example, a Java based application that allows a remote service provider some limited control over the communication functionality of the web-enabled device. As such, in one of the embodiments where the service provider provides an instruction to a web-enabled device, the performance of which requires physical access to a packet telephony device, the instruction may be a software based instruction prompting the web-enabled and packet telephony device to automatically communicate with each other over a secure connection over a secure network or a localized communication. In one embodiment, a service provider could, for example, send each device a shared key such that the two devices can perform a handshake to establish a secure connection between the two.

The networks and protocols identified throughout this specification are exemplary in nature. Alternative networks and protocols, currently existing or not, are intended to fall within the scope of the invention.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method for authenticating a user request from a web-enabled device comprising:
   registering a VoIP packet telephony device with a VoIP packet telephony service provider for subsequent VoIP packet telephony communication based at least on an encryption key encoded therein;
   receiving the request from the web-enabled device; subsequent to registering the VoIP packet telephony device with the VoIP packet telephony service;
   transmitting an instruction to the web-enabled device, the performance of which requires physical access to said VoIP packet telephony device by the user;
   receiving an indication of the performance of the instruction; and
   authenticating the request based upon the indication of the performance of the instruction;
   wherein the VoIP packet telephony device is configured for VoIP communication via internet protocol voice packets over a packet switched network and the VoIP packet telephony service provider provides voice communication via internet protocol voice packets over the packet switched network; and,
   wherein the step of receiving the indication of the performance of the instruction comprises receiving a translated code via the web-enabled device, the translated code being a first code translated based at least in part on the encryption key in the VoIP packet telephony device.

2. The method of claim 1, wherein performance of the instruction comprises:
   receiving a first code into the VoIP packet telephony device;
   translating the first code based upon the encryption key in the VoIP packet telephony device to produce a translated code;
   displaying the translated code on the VoIP packet telephony device; and
   receiving the translated code in the web-enabled device.

3. The method of claim 1, wherein the instruction is text displayed on the web-enabled device, whereby the user can read and comply with the instruction.

4. The method of claim 1, wherein the VoIP packet telephony device communicates with the web-enabled device over a wireless connection in a wireless local area network or wireless personal area network.

5. The method of claim 4, wherein the wireless connection is a frequency hopping spread spectrum connection in the 2.4 Ghz short-range radio frequency band.

6. The method of claim 1, wherein the VoIP packet telephony device communicates with the web-enabled device over a secure network.

7. The method of claim 1, wherein the step of receiving a request further comprises receiving a user name and password.

8. The method of claim 1, wherein the step of authenticating the request is performed after a subscriber account related to the request has been identified as compromised.

9. The method of claim 1, wherein the request is a request to access a subscriber account.

10. The method of claim 9, wherein the subscriber account is a non-telephony account.

11. A method for authenticating a user request from a web-enabled device comprising:
- registering a VoIP packet telephony device with a VoIP packet telephony service provider for subsequent VoIP packet telephony communication based at least on an encryption key encoded therein;
- receiving the request from the web-enabled device; subsequent to registering the VoIP packet telephony device with the VoIP packet telephony service;
- transmitting an instruction to the web-enabled device, the performance of which requires physical access to said VoIP packet telephony device by the user;
- receiving an indication of the performance of the instruction; and
- authenticating the request based upon the indication of the performance of the instruction;
- wherein the VoIP packet telephony device is configured for VoIP communication via internet protocol voice packets over a packet switched network and the VoIP packet telephony service provider provides voice communication via internet protocol voice packets over the packet switched network; and,
- wherein the instruction is a software-based instruction prompting an automated communication between the web-enabled device and the VoIP packet telephony device, and wherein the automated communication is the performance that requires physical access to the device.

* * * * *